United States Patent
Baugh (10) Patent No.: US 9,395,027 B2
(45) Date of Patent: Jul. 19, 2016

(54) BEND PROTECTOR FOR A PIPELINE BEND

(71) Applicant: Benton Baugh, Houston, TX (US)

(72) Inventor: Benton Baugh, Houston, TX (US)

(*) Notice: Subject to any disclaimer, the term of this patent is extended or adjusted under 35 U.S.C. 154(b) by 449 days.

(21) Appl. No.: 13/897,154

(22) Filed: May 17, 2013

(65) Prior Publication Data
US 2014/0338775 A1    Nov. 20, 2014

(51) Int. Cl.
| | | |
|---|---|---|
| F16L 57/06 | (2006.01) | |
| B08B 9/04 | (2006.01) | |
| F16L 57/02 | (2006.01) | |
| E21B 23/14 | (2006.01) | |
| B08B 9/027 | (2006.01) | |
| F16L 101/50 | (2006.01) | |

(52) U.S. Cl.
CPC ............ *F16L 57/02* (2013.01); *E21B 23/14* (2013.01); *F16L 57/06* (2013.01); *B08B 9/027* (2013.01); *B08B 9/04* (2013.01); *F16L 2101/50* (2013.01)

(58) Field of Classification Search
CPC . F16L 55/165; F16L 55/1652; F16L 55/1653; F16L 55/18; F16L 55/26; F16L 57/00; F16L 57/06; F16L 2101/10; F16L 2101/50; B08B 9/027; B08B 9/04; B08B 9/043; B08B 9/055
See application file for complete search history.

(56) References Cited

U.S. PATENT DOCUMENTS

| | | | | |
|---|---|---|---|---|
| 1,982,402 A * | 11/1934 | Shade | ............. | E03C 1/302 15/104.33 |
| 2,163,947 A * | 6/1939 | Hochberger | ............. | E03F 9/002 15/104.33 |
| 2,332,940 A * | 10/1943 | Senke | ............. | B08B 9/08 134/167 R |
| 2,946,560 A * | 7/1960 | Ferm | ............. | B65H 57/12 141/331 |
| 3,306,581 A * | 2/1967 | Miller | ............. | H02G 1/08 254/134.3 FT |
| 4,630,649 A * | 12/1986 | Oku | ............. | G02B 23/2476 138/122 |
| 6,171,435 B1* | 1/2001 | Stoves | ............. | F16L 55/179 138/97 |
| 6,651,744 B1 | 11/2003 | Crawford | | |
| 7,341,101 B1* | 3/2008 | Moretz | ............. | E21B 33/072 166/241.5 |
| 7,862,257 B2* | 1/2011 | Jeong | ............. | F16L 3/012 226/189 |
| 8,122,913 B2* | 2/2012 | Stark | ............. | B65H 57/12 138/106 |
| 2013/0019684 A1* | 1/2013 | Krywyj | ............. | F16L 55/28 73/592 |

FOREIGN PATENT DOCUMENTS

CA    1209453 A1 *    8/1986    ............ B21D 9/03

* cited by examiner

*Primary Examiner* — Frederick L Lagman (57) ABSTRACT

A protector for protecting the internal bore of a pipeline bend from a line being pulled through the pipeline bend during servicing operations including a first liner section which will travel along the pipeline to the pipeline bend but which will not pass through the pipeline bend, a one or more of second liner sections which will pass through the bend but are connected to the first liner section, releasably connecting the liner sections to a service pig, pulling the liner sections into the pipeline with the service pig until the first liner section encounters the bend and stops, continuing travel with the service pig and releasing the service pig from the liner sections, and constraining a line connected to the service pig to be positioned within the liner sections rather than contacting the pipeline bend.

19 Claims, 12 Drawing Sheets

BEND PROTECTOR FOR A PIPELINE BEND

TECHNICAL FIELD

This invention relates to the method of protecting a bend in a pipeline from abrasion and galling due to the drag friction of a tubing string or wireline which is pulled through the pipeline bend.

BACKGROUND OF THE INVENTION

A majority of offshore oil and gas is produced form platforms which are erected on the seafloor and extend to above the water surface. Oil and gas is typically transported to and from these offshore platforms along pipelines laid on the seafloor. When these pipelines arrive to or depart from one of these platforms, a bend is used at the intersection of the seafloor and the platform and a vertical section of pipe or riser extends up to the platform deck. At the platform deck will be valves and piping to communicate the pipeline with equipment and/or wells on the deck of the platform.

Subsea pipelines which transport oil tend to have the waxy components of the oil come out of solution and bond to the wall of the pipeline, up to in some cases completely blocking the pipelines. In consistence, the waxy blockage appears to be exactly like black shoe polish. In most cases, a layering on the walls of the pipeline is seen and a cleaning pig passes through the pipeline to remove the waxy layering. In some cases instead of simply cleaning the layer of wax off the pipeline wall, it chips it off until it accumulates into a blockage.

When subsea pipelines which transport gas encounter the proper pressure/temperature combination and there is some water in the pipeline, a hydrate is formed. The hydrate looks a lot like crushed ice and will form quickly to create a blockage to stop the flow in the pipeline.

In either of these cases the flow of production is stopped and causes an expensive loss of production. In the case of a hydrate blockage, the operator can simply wait a few days, weeks, or months and the hydrate will melt naturally if pressure is bled off from one end or the other of the pipeline. In the case of the waxy or paraffin blockage, it is permanent until fixed.

As "fixing" these problems typically required mechanical drilling of the blockage, hot oil injection, or chemical dissolving of the blockage, communication to the blockage in the pipeline must be established. The characteristic way to establish this communication is by inserting a string of coiled tubing. A hose would work as well, but the strings of coiled tubing for up to 5 miles in length exist in the market. The hoses do not exist in the market at this length, and would be very expensive in comparison if they did.

Crawford U.S. Pat. No. 6,651,744 shows a coiled tubing string with a thruster pig (10) attached to the end for this purpose and illustrates in FIG. 12 the coiled tubing reel (150), and various other pieces of required equipment. Of note is a 5D bend section (15) which is at the intersection of the seafloor pipeline and the vertical riser. "5D" means that the bend radius of the centerline of that pipe section is 5 times the outer diameter of the pipeline. Sending equipment down the vertical pipe section around the 5D bend and then going out up to 5 miles is a very difficult goal to achieve, and is a common requirement of many offshore pipelines. If you imagine that in a 4.5 inch outer diameter pipeline this bend radius is 22.5 inches, then the steel coiled tubing must negotiate this bend.

The first problem in navigating this bend is that bending 1 to 1¾ inch outside diameter coiled tubing to a radius of 22.5 inches substantially bends and unbends the coiled tubing as it passes, both going and coming back which has a deteriorating effect on the coiled tubing. Secondly, the high loading on the inside of the pipeline bend and the outside diameter of the coiled tubing when it is being plastically bent tends to cause galling on both pipes, which destroys the integrity of whichever one(s) is galled. Thirdly, the force of pulling the coiled tubing back through the bend from its extended travel position is added to the force of pulling the coiled tubing back, pulling the pig back, and swabbing the fluid behind the coiled tubing back. At some point, you simply cannot pull the coiled tubing back and have caused a worse problem than the blockage itself.

When any or all of these factors is a concern, the only solution is to pick the pipeline up off the seafloor, saw it in half, and attach expensive connectors to the pipeline. This allows the operator to go directly into the end of the pipeline without having to pass a difficult bend. A complication to this is that before the operator can saw the pipeline in half, the pressure must be completely removed from the pipeline. Additionally, as you are sawing into a pipeline with at the least gas fumes in it, you may cause a spark.

An additional problems when going around the pipeline bends is that any equipment to pass the bend must be by definition very short or it simply will not pass and the bending of the coiled tubing tends to import moment loading on the equipment, such as the thruster pig at the end of the coiled tubing.

Offshore platforms with vertical riser pipes have been utilized in the offshore industry as long as it has existed, since the mid 1950's. Coiled tubing became available as an oilfield service tool in the mid 1960's and the marriage of these two systems happened shortly thereafter. The industry is still dealing with the problem of how to reasonably get the coiled tubing around the bends, and the most common answer today is to expensively pick the pipeline up and avoid the problem.

BRIEF SUMMARY OF THE INVENTION

The object of this invention is to provide a method of installing a protective liner in the bend between a subsea pipeline and a vertical pipe riser at a platform.

A second object of this invention is to provide a method of protecting a thruster pig from the side forces resulting from the bend in the coiled tubing after going through the bend between a subsea pipeline and a vertical pipe riser at a platform.

A third objective of this invention is protect the sealing cup of a thruster pig from being heavily worn on one side due to the weight of the thruster pig.

BRIEF DESCRIPTION OF THE DRAWINGS

FIG. 7 is the partial half section of FIG. 6 with the thruster pig assembly released from the bend liner and running out into the pipeline. The bend liner is protecting the bend from damage by the coiled tubing passing through.

DETAILED DESCRIPTION OF THE INVENTION

Figure 1:
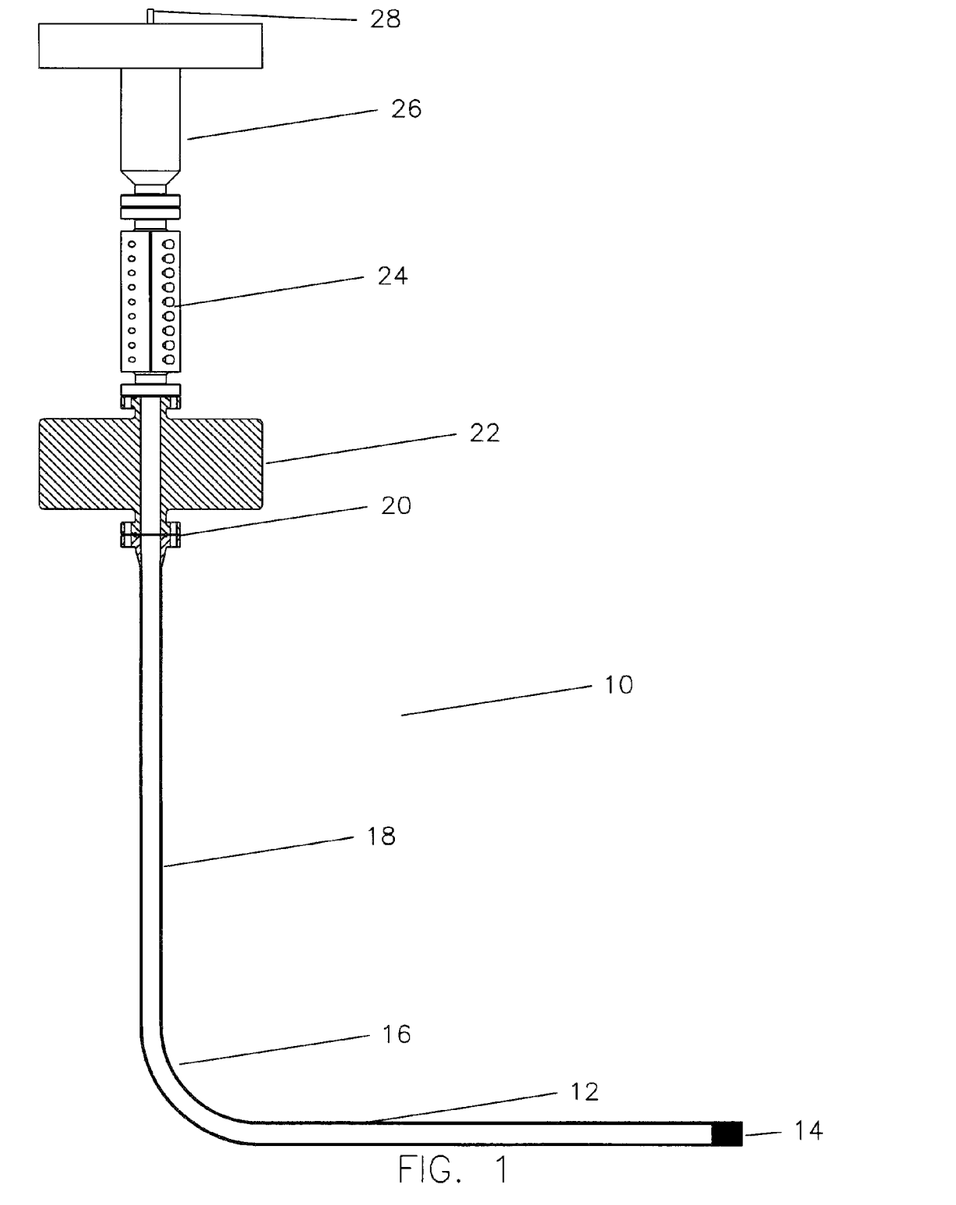
FIG. 1 is a partial half section of a subsea pipeline and the vertical riser which would be near an offshore platform, with service equipment to facilitate this method landed on the top of the vertical riser.

Referring now to FIG. 1, a half section view of a complete system 10 on the side of an offshore platform (not shown) which is prepared for the method of this invention. Seafloor pipeline 12 has a blockage 14 at some distance from the bend 16 at the base of a vertical riser 18. Vertical riser 18 has a top flange 20 with pressure control equipment 22 landed on top of it. Pressure control equipment 22 represents valves during regular production and blowout prevention equipment during service operations. Above pressure control equipment 22 is a working window 24 and service equipment 26 above that. Working window 24 is a pressure vessel with side openings to allow the insertion of tools into the well bore. Service equipment 26 comprises a variety of items which will change from location to location. These items might include a stripper for sealingly engaging the coiled tubing, slips to temporarily support the coiled tubing or to stop the coiled tubing in an emergency, a coiled tubing injector head to push or pull the coiled tubing into our out of the pipeline, etc. Coiled tubing 28 is shown entering the top if the injector head, but is not shown having gone in far enough to be seen in the control equipment 20.

Figure 2:
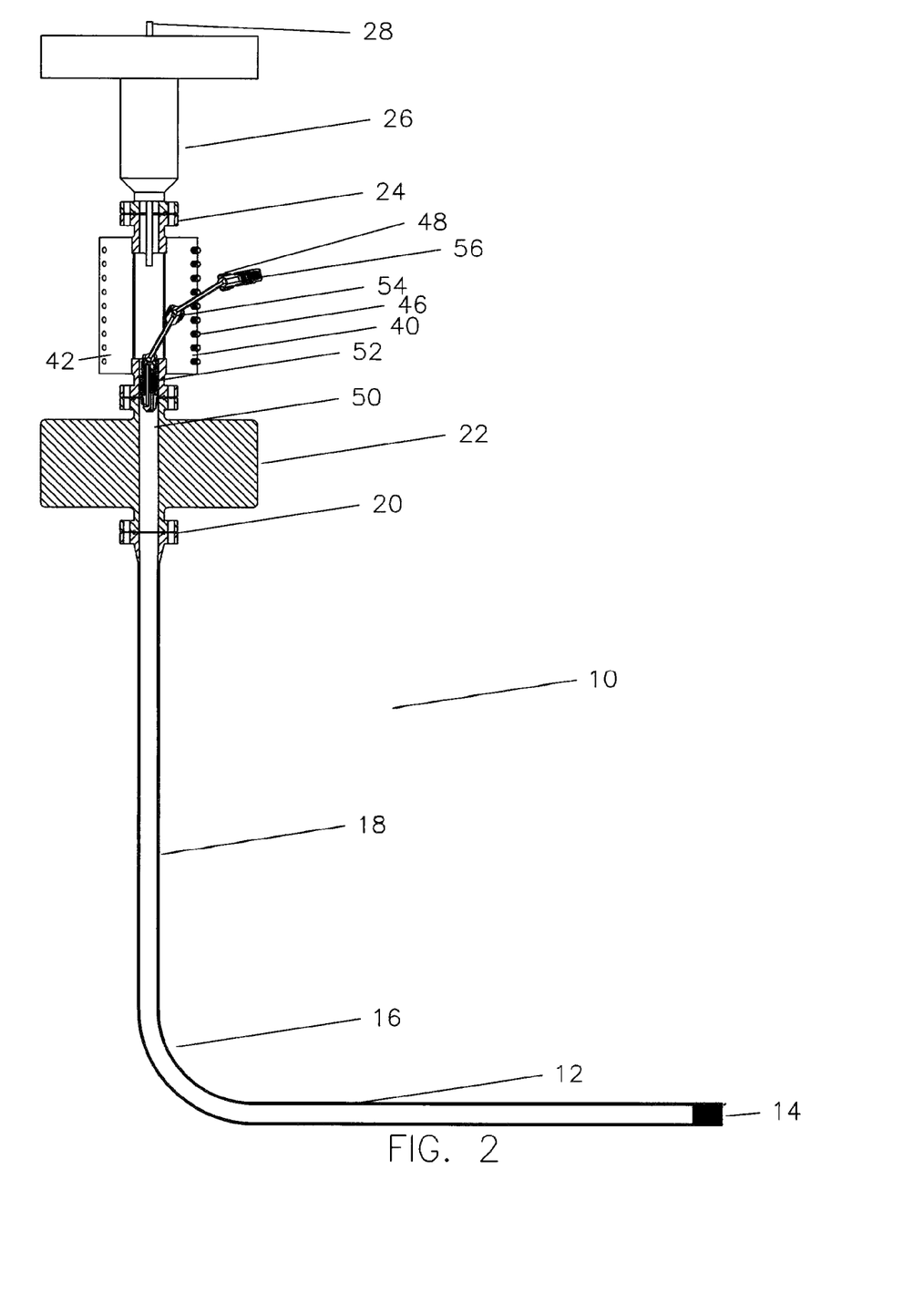
FIG. 2 is the partial half section of FIG. 1 with the work window opened and a thruster pig assembly being inserted into the bore.

Referring now to FIG. 2, doors 40 and 42 have been opened by releasing bolt 46 and thruster pig assembly 48 has been started to be placed into the bore 50. Thruster pig assembly 48 comprises thruster pig 52, ball joint 54, and coiled tubing connector 56. It should be noted that both thruster pig 52 and coiled tubing connector 56 include a ball joint mechanism to allow the flexibility to allow this operation thru the work window 24.

Figure 3:
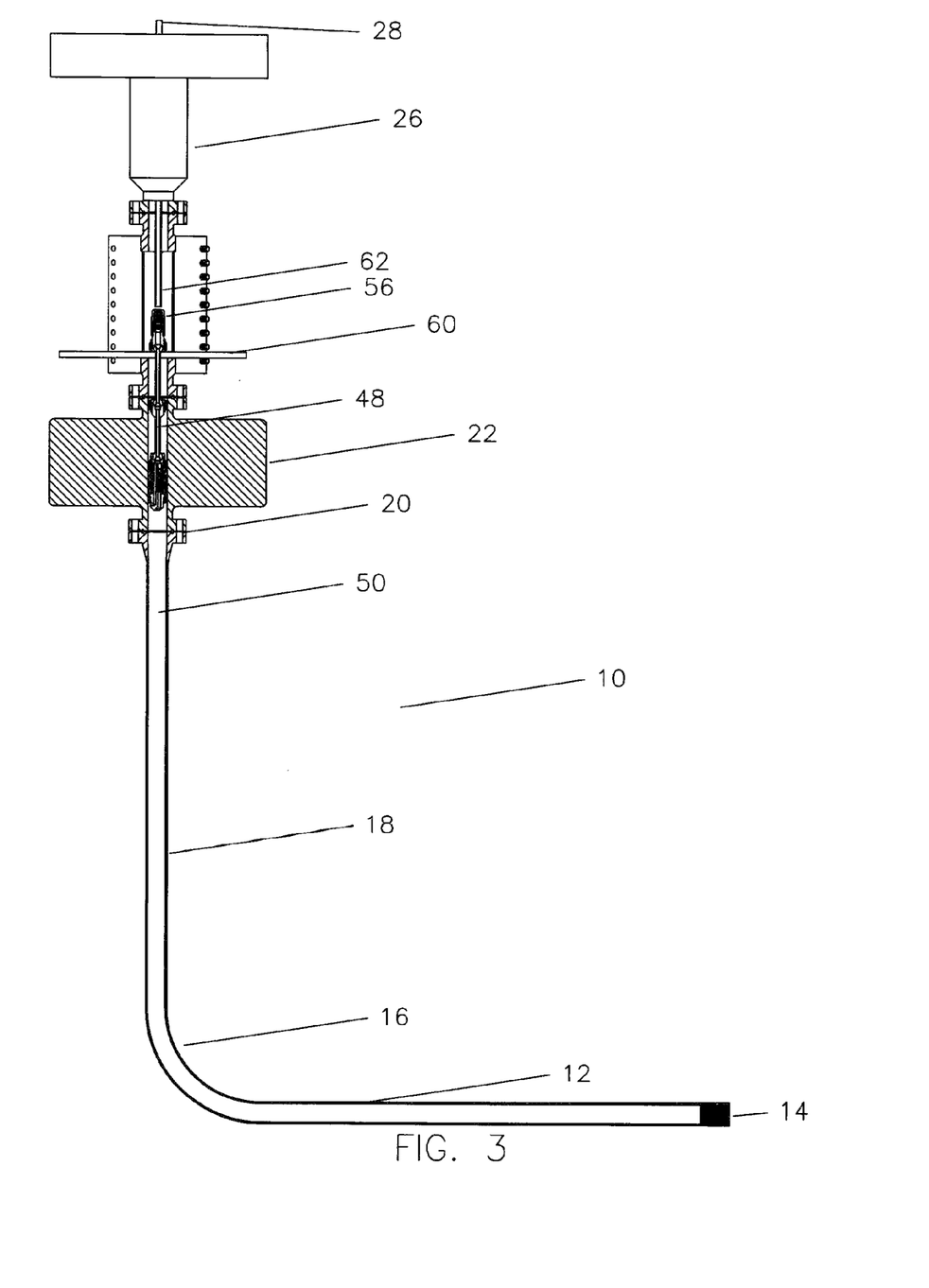
FIG. 3 is the partial half section of FIG. 2 with the thruster pig assembly fully inserted into the bore.

Referring now to FIG. 3, thruster pig assembly 48 is fully in bore 50 and is temporarily supported on bars 60. The lower end 62 of coiled tubing 28 is being lowered to engage the coiled tubing connector 56.

Figure 4:
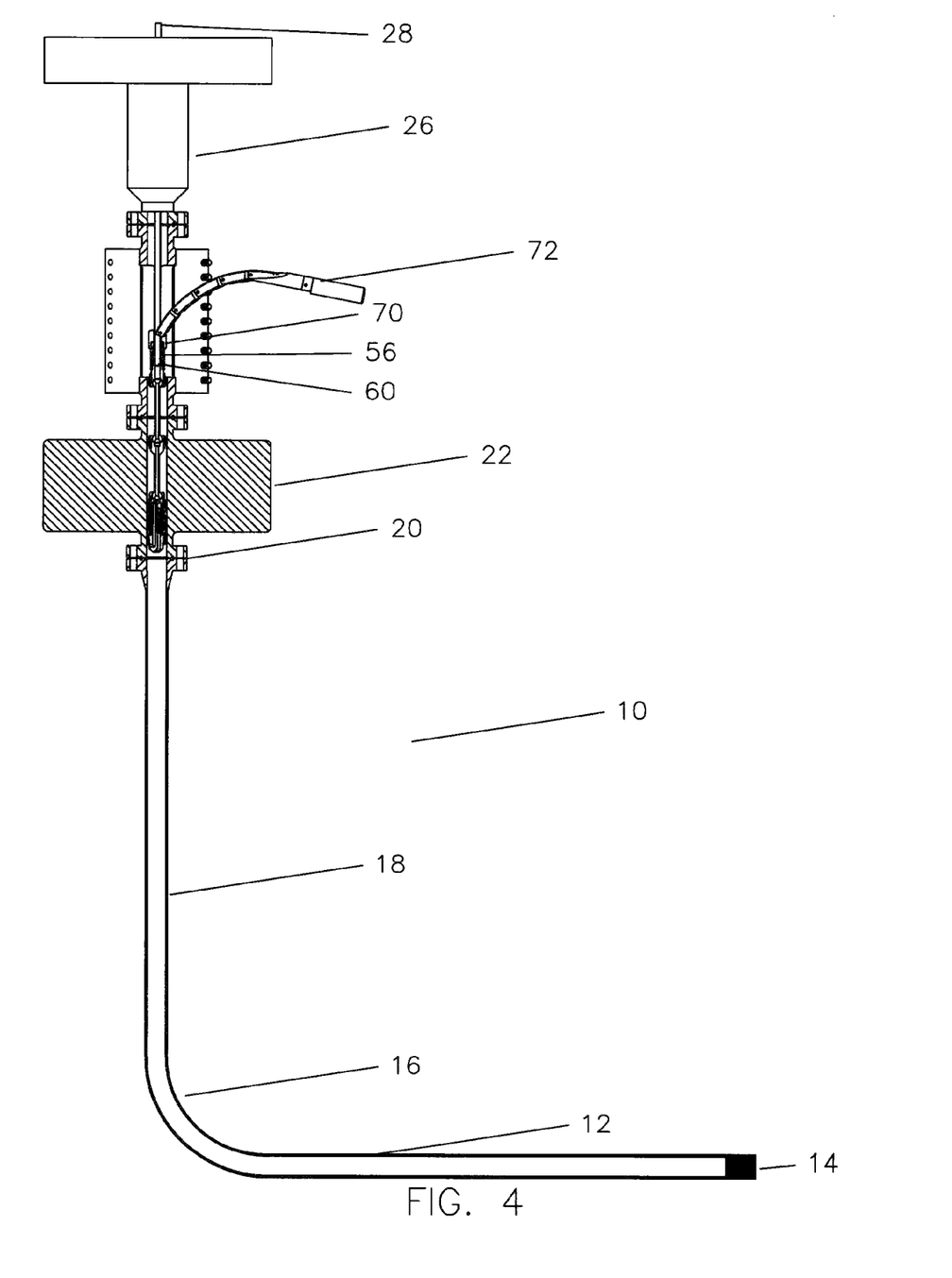
FIG. 4 is the partial half section of FIG. 3 with the end of the coiled tubing string engaging the thruster pig assembly and a bend liner being connected to the thruster pig assembly.

Referring now to FIG. 4, the lower end 62 of coiled tubing 28 is engaged with coiled tubing connector 56 and the end 70 of bend protector 72 is attached to the coiled tubing connector 56. The likely method of connection will be with a shear pin which will be discussed later.

Figure 5:
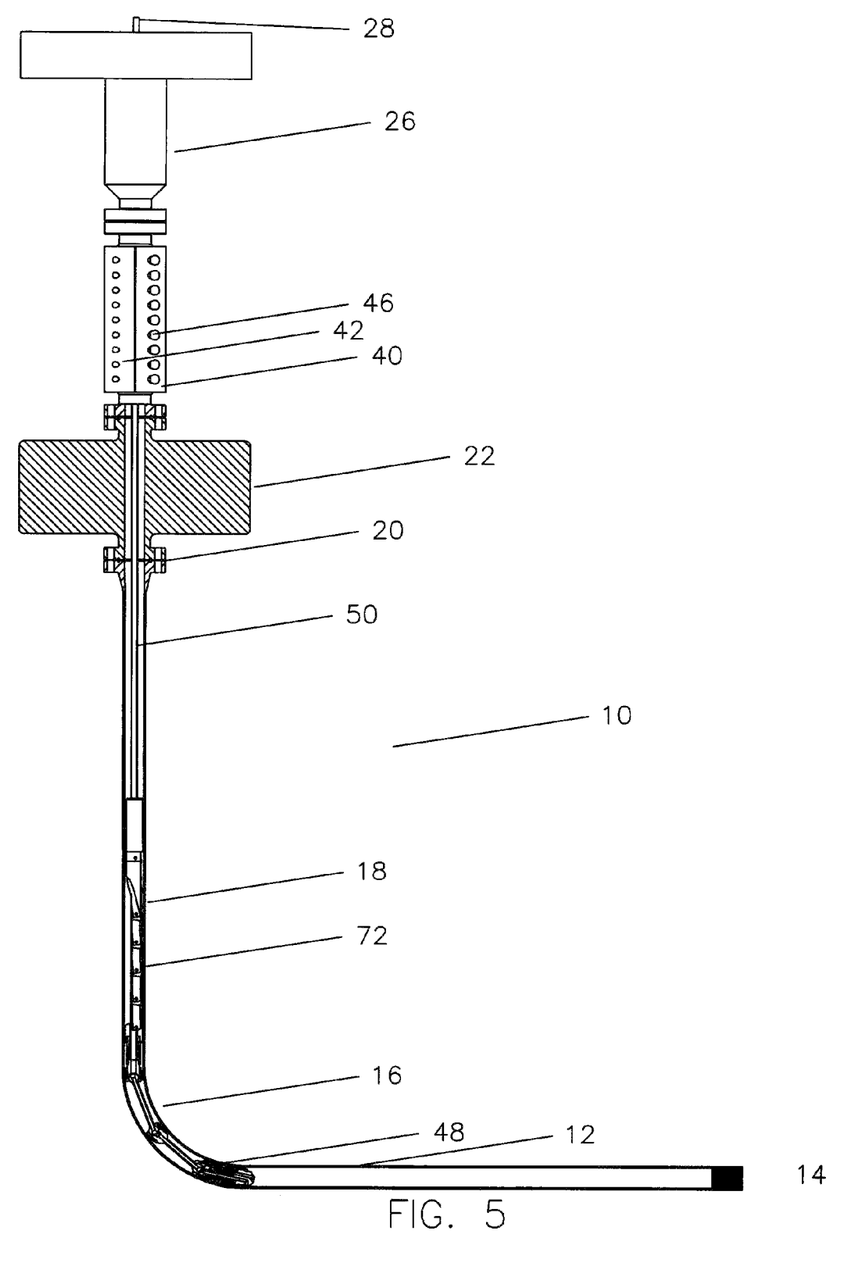
FIG. 5 is the partial half section of FIG. 4 having the thruster pig assembly run down into the bend at the base of the vertical riser.

Referring now to FIG. 5, coiled tubing 28 is lowered until the bend protector 72 is fully within bore 50, doors 40 and 42 are closed, bolts 46 are engaged and tightened, thruster pig assembly 48 is in the bend 16, and the bend liner is following.

Figure 6:
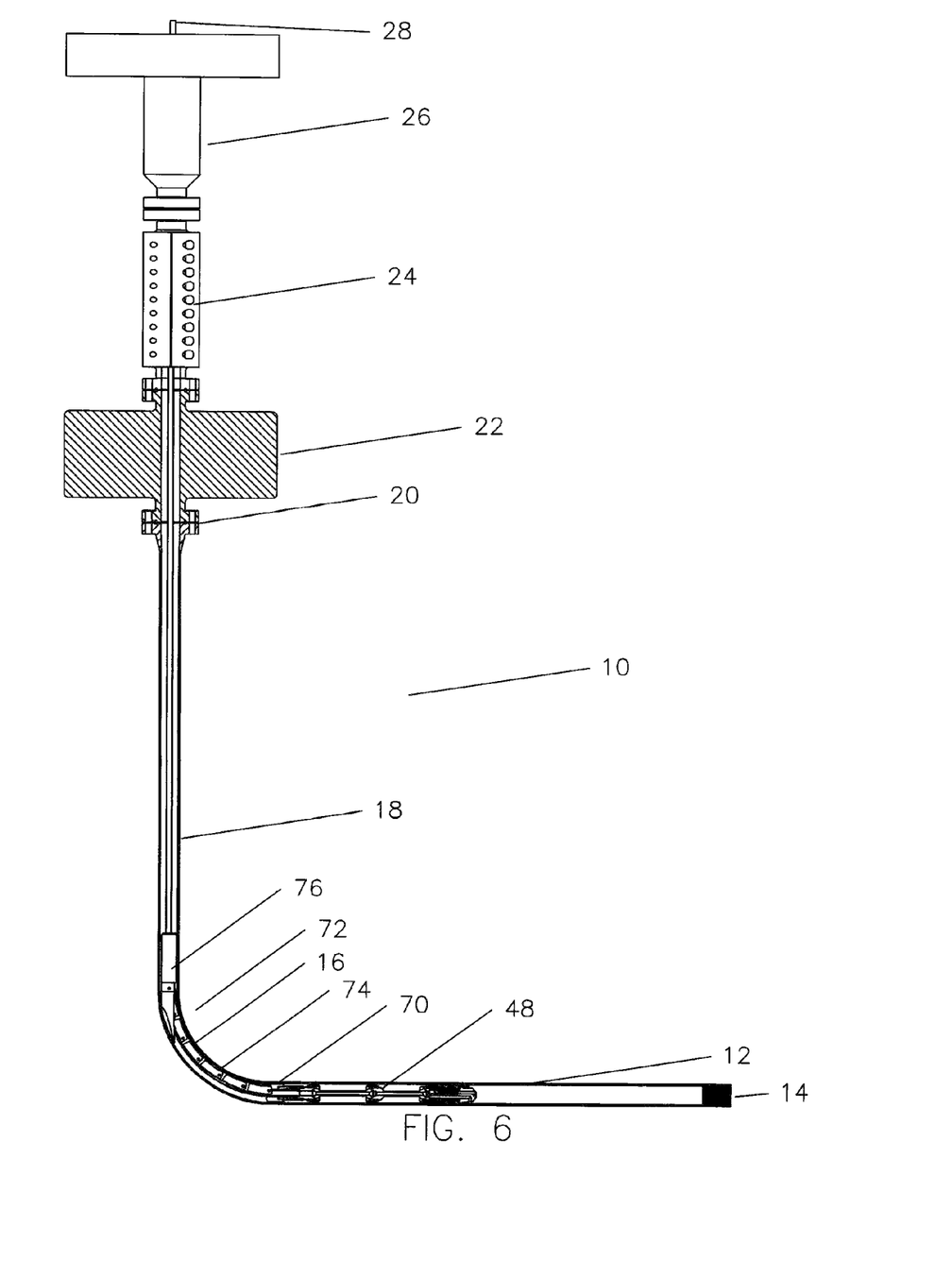
FIG. 6 is the partial half section of FIG. 5 with the thruster pig assembly out of the bend and into the pipeline, and the bend liner in the bend.

Referring now to FIG. 6, thruster pig assembly 48 is not fully in the pipeline 12 and bend protector 72 is in the bend 16. Sections 74 of bend protector 72 are short enough and flexible enough to pass through the bend 16. Section 76 of bend protector 72 is long enough and is of a shape such that it will not navigate the curve of bend 16 and therefore acts as a position stop to cause the bend protector 72 to remain in bend 16 as thruster pig assembly 48 travels out into the pipeline. When thruster pig assembly 48 returns to the bend 16 it will engage the bend protector 72 and push it back up the vertical riser 18.

Figure 7:
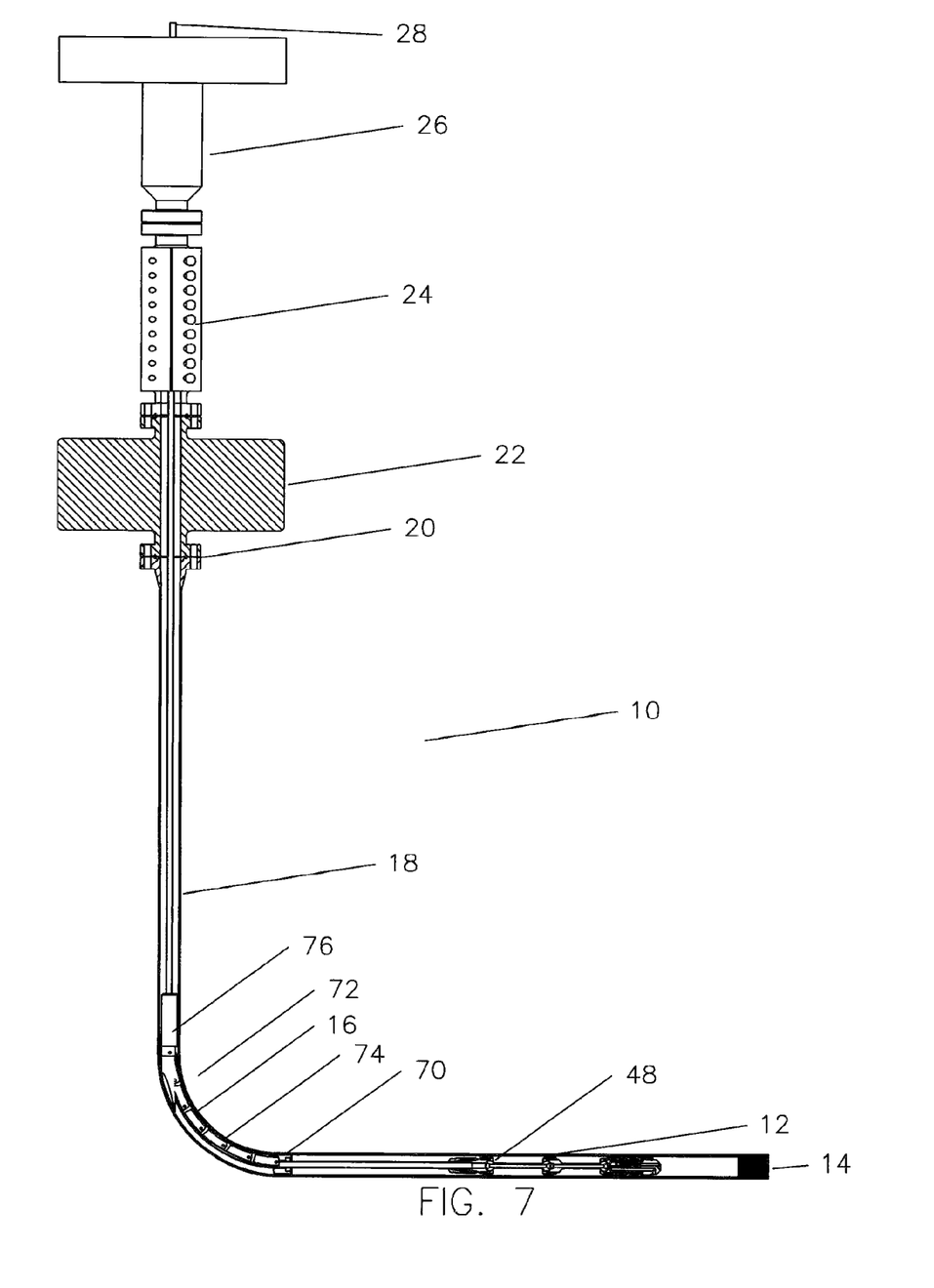

Referring now to FIG. 7, additional pressure for force applied to thruster pig assembly 48 causes it to release from the bend protector and travel further into the pipeline. As the thruster pig assembly 48 travels into the pipeline and pulls the coiled tubing behind it, the bend liner 72 protects the bend of the pipeline from wear and galling by the coiled tubing.

Figure 8:
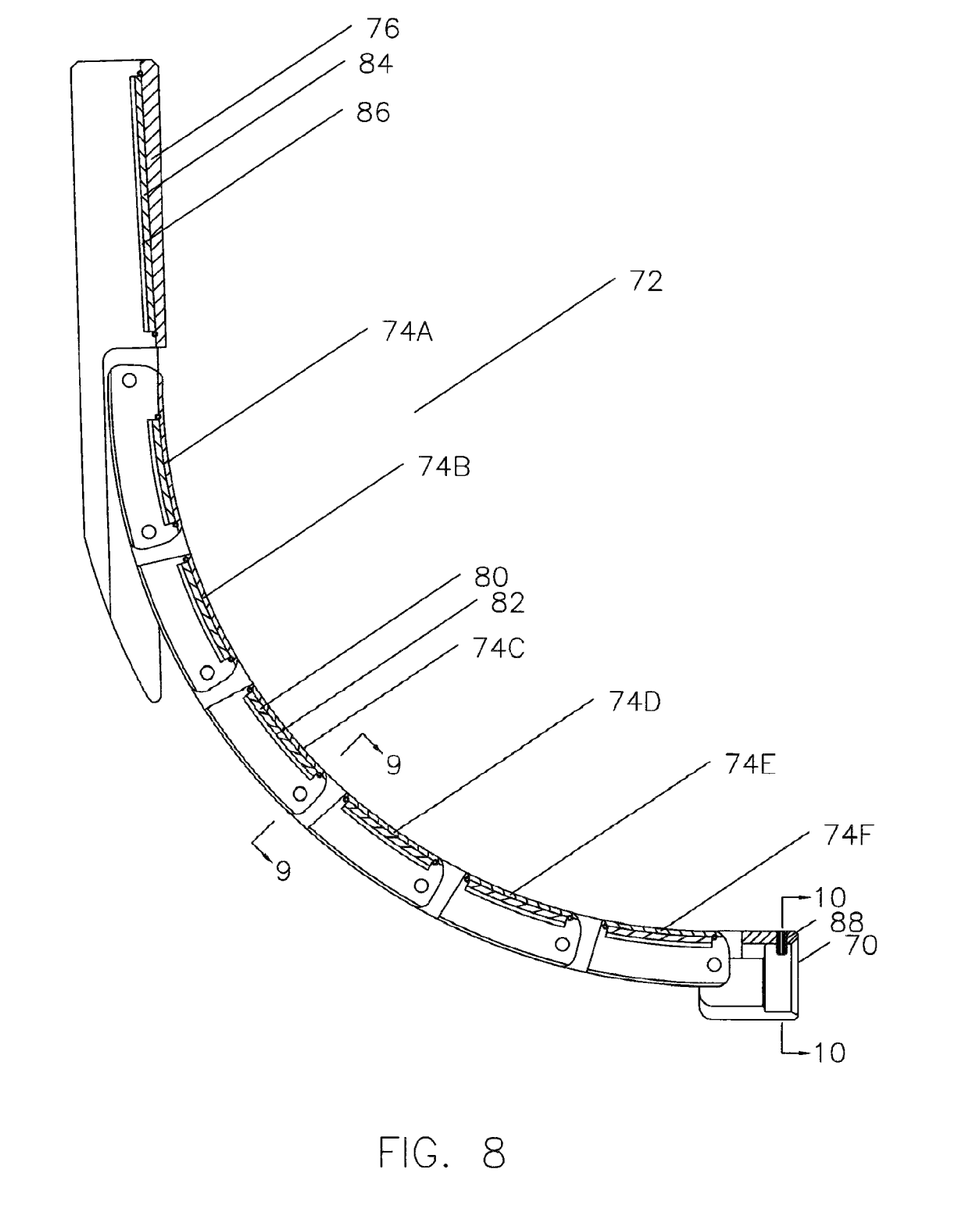
FIG. 8 is a half section of a bend liner in the curved shape which it would have when it is in the bend.

Referring now to FIG. 8, a half section of the bend protector 72 as was shown in FIG. 7 is shown in greater detail. Section 74 is shown as individual sections 74A-74F. Each of these individual sections has an insert 80 of low friction material such as Teflon provided in a curve generally matching the curve of the bend 16 to slide the coiled tubing against. The coiled tubing will be engaging a surface 82 of a low friction material and the individual sections 74A-74F will be engaging the bend 16 with a steel on steel contact to insure that the bend liner 72 will remain in place when the coiled tubing is travelling out, or is coming back. Similarly, section 76 is outfitted with a low friction insert 84 with surface 86 for engaging the coiled tubing. End 70 of bend protector 72 has a shear pin 88 for attaching to coiled tubing connector 56 on the end of the thruster pig assembly 48 as seen in FIG. 4. The shear pin 88 is conveniently in this case a hollow pin which threads into both pieces so that no loose pieces will be left in the pipeline.

Figure 9:
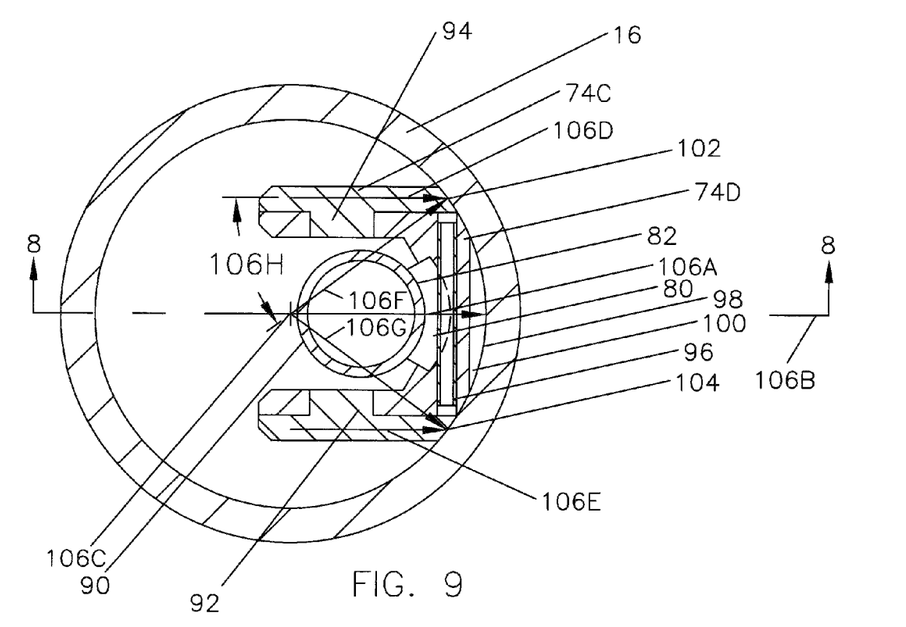
FIG. 9 is a section of the bend liner of FIG. 8 taken along lines "9-9".

Referring now to FIG. 9 which is taken from section "9-9" of FIG. 8, coiled tubing 90 is shown bent around and engaging surface 82. Pin portions 92 and 94 act as connections and pivots between individual sections 74C and 74D and can be round pins welded into holes on individual section 74C. Spring pin 96 would be inserted at each end of insert 80 to retain it in position. It can be noted that individual sections 74C and 74D do not contact the pipe bend 16 at the center position 98, but rather clearance 100 allows it to contact at 102 and 104. This angular contact amplifies the force of contact to give an ever greater difference in the forces as was discussed with respect to FIG. 8. The force 106A of coiled tubing 28 around the bend of pipe happens in the plane 106B as indicated by section line "8-8" passes through the centerline 106C of pipeline bend 16, however it is supported at contacts 102 and 104 as forces 106D and 106E which are each shown graphically as ½ of the force 106A. Forces 106F and 106G are the normal to the surface forces associated with forces 106D and 106E respectively, and they are larger by the inverse of the cosine of the angle 106H, meaning that the friction force causing normal contact force has increased assisting the bend protector in remaining in position as the coiled tubing is pulled back through the pipeline bend 16. This angular contact can be pushed to about 45 degrees to each side which would amply the force about 41% over plain steel on steel contact.

Figure 10:
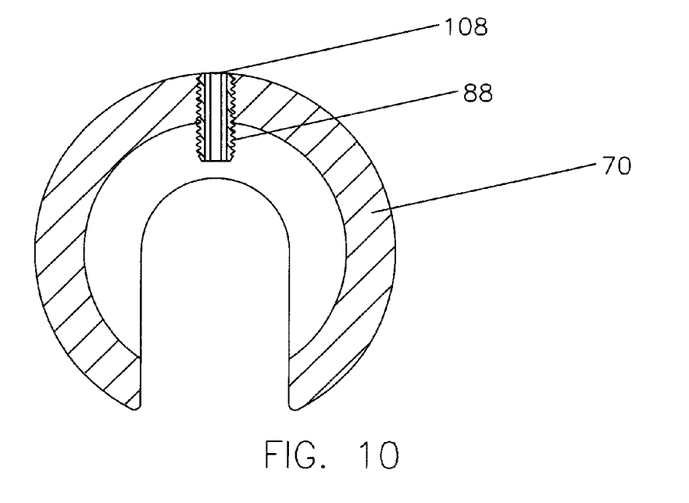
FIG. 10 is a section of the bend liner of FIG. 8 taken along lines "10-10".

Referring now to FIG. 10, shear pin 88 is illustrated as an all thread brass piece with a hex 108 broached all the way through to make it easy to install, remove and to shear. This style construction means that both ends of the shear pin will be positively restrained rather than being lost in the pipeline to cause other problems.

Figure 11:
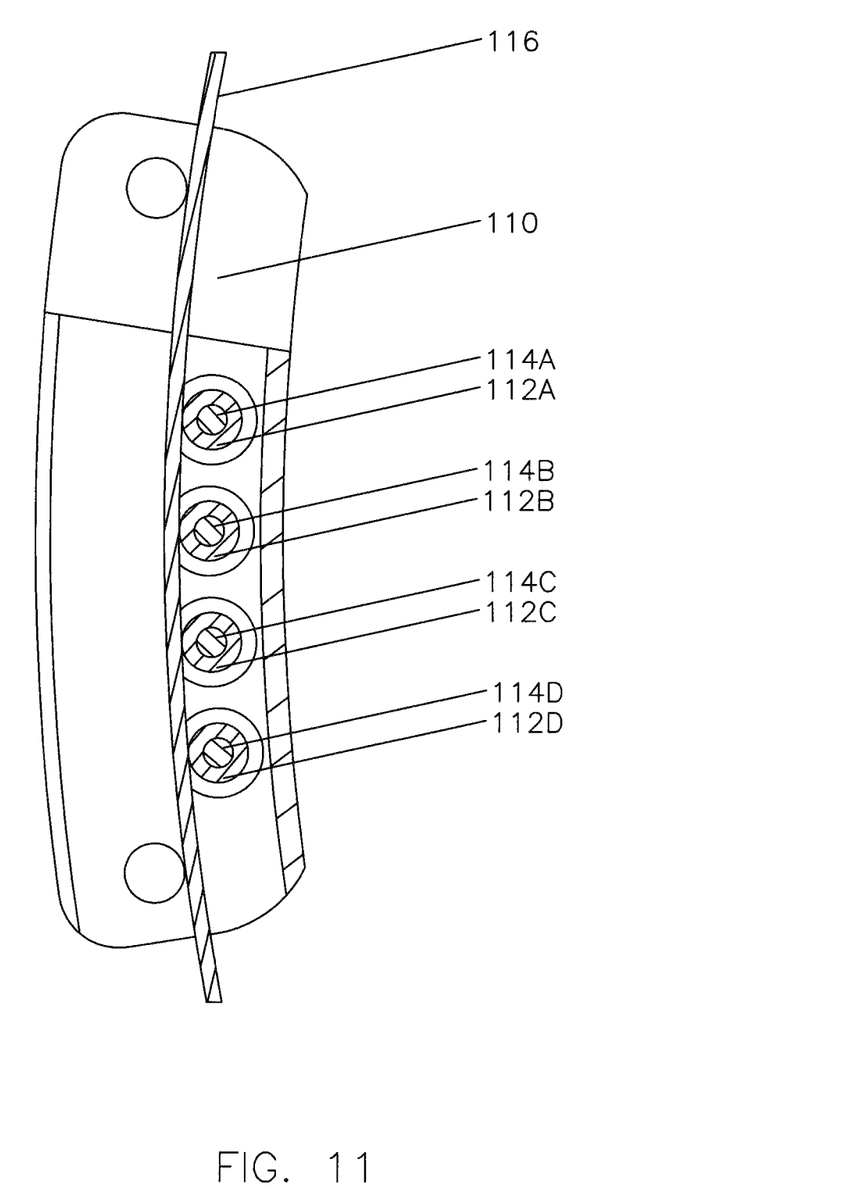
FIG. 11 is a half section of one of the sections of the bend liner with rollers substituted for the low friction material to make it better suited to accommodate a wire rope.

Referring now to FIG. 11, individual section 110 is shown with rollers 112 A-D being mounted on axles 114 A-D rather than having an insert 80 of low friction material such as Teflon. A wire rope 116 is shown being guided in the rollers 112 A-D. As a wire rope such as 116 is often a steel twisted wire, it has the potential to not only saw in to the bend 16, but also into the insert 80 of FIG. 8. By having rollers, the bend liner can be adapted to handle the use of wire rope pigs such as are illustrated in U.S. Pat. No. 7,998,276.

Figure 12:
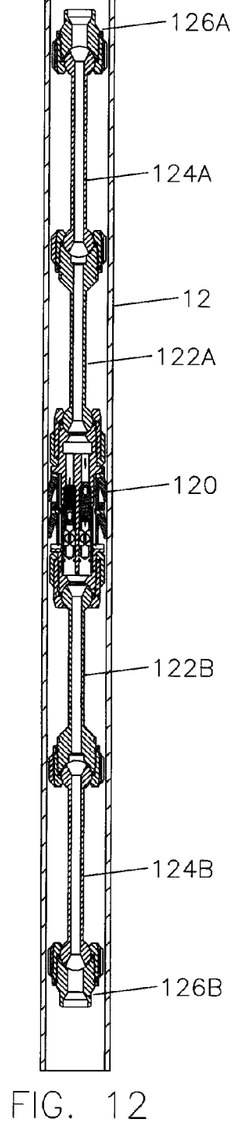
FIG. 12 is half section of a thruster pig assembly which is similar to the thruster pig assembly first shown in FIG. 2, but is adapted to be in the central portion of the coiled tubing string rather than at the end and is adapted to assist in pulling the coiled tubing back rather than pulling it out to the blockage site.

Referring now to FIG. 12, thruster pig assembly 120 is shown in pipeline 12, having ball×ball socket adaptors 122A and 122B on each end, then ball×ball adaptors 124A and 124B connected, then ball socket×buff-weld adaptors 126A and 126B at each end for welding to coiled tubing strings. Thruster pig assembly 120 is similar to thruster pig assembly 48 seen on FIG. 7, except thruster pig assembly 48 was a terminal type for the end of the coiled tubing for primarily pulling out into the pipeline. The ability to use thruster pig assembly 48 for returning forces is limited by column buckling forces of the coiled tubing. Thruster pig assembly 120 is intended for the middle of a coiled tubing string for the opposite purpose of pulling the coiled tubing back rather than pulling it out. Otherwise the mechanisms of the pigs can be similar.

Figure 13:
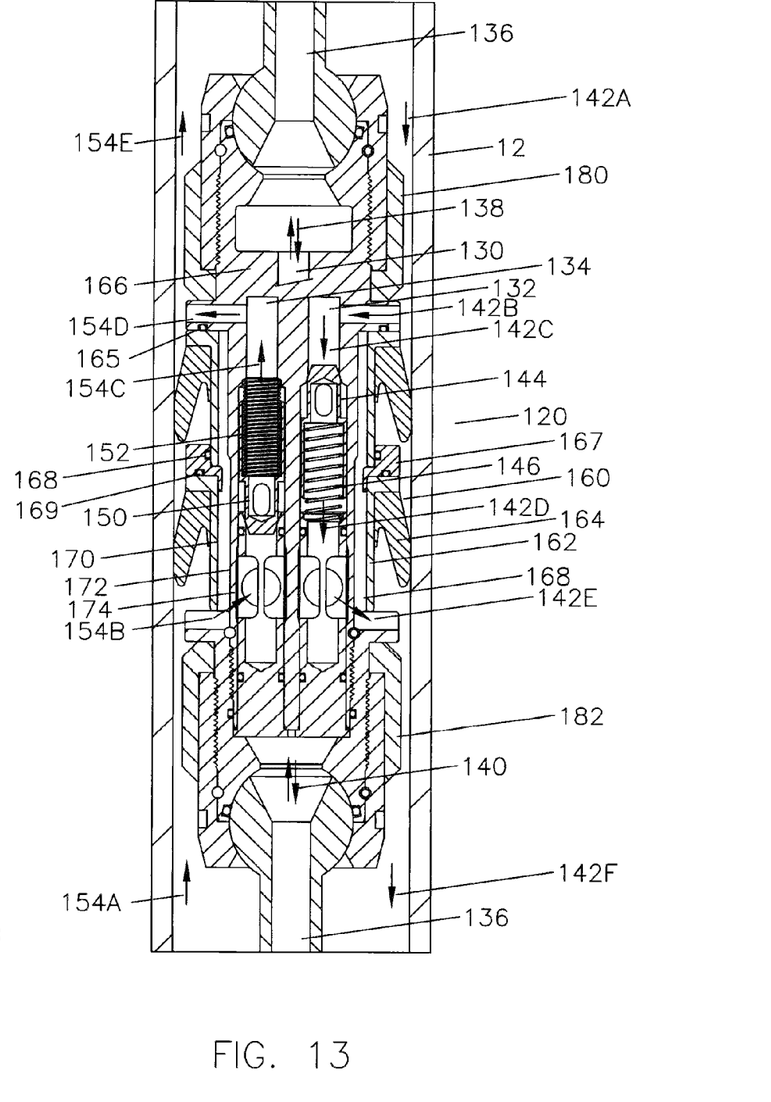
FIG. 13 is an enlargement of the central portion of FIG. 12.

Referring now to FIG. 13 which is an enlargement of the center section of FIG. 12, thruster pig assembly 120 is shown in greater detail. Thruster pig 120 has 3 central bores at approximately 30 degrees, 130, 132, and 134. Bore 130 is only partially shown and simply communicates the flow inside the central bore 136 in either direction as indicated by arrows 138 and 140. Bore 132 directs flow as indicated by arrows 142A-F from the proximate end of the pig to the distal end during travel of the coiled tubing out into the pipeline. Check valve 144 has a weak spring 146 so as to block reversed flow but not to cause a significant pressure differential in the outward trip. On the trip out to the blockage located in the pipeline, it is as if this thruster pig does not exist.

Bore 134 has check valve 150 with stronger spring 152 which will cause a predetermined pressure differential across thruster pig assembly 120 when flow is coming in the direction of arrows 154A-E. This predetermined pressure differential will combine with the cross sectional sealing area within the pipeline to give a predetermined force to assist the coiled tubing in being recovered from the pipeline. Rather than long lengths of coiled tubing being drug back by pulling around a bend such as was indicated at 16, it can be pulled by the force across one or more thruster pig assemblies 120. The dominant force in coiled tubing will be tension without the column buckling tendency, but some limited force can also push the coiled tubing ahead of the pig.

Thruster pig assembly 120 is illustrated as being welded into the coiled tubing string but other options are available. Slip type connectors and threaded connectors are available in some cases. Specifically in the case of slip type connectors, coiled tubing can be run through the thruster pig assembly until the appropriate connection point, the slips set, and then the pig can be run with the coiled tubing. Design requirements of this type pig make it increasingly difficult to pass 5D bends, and tend to be limited to applications with larger radius bends.

Sealing cups 160 comprise a metal seal carrier 162 and a resilient cup member 164. O-ring type seal 165 seals between the metal seal carrier 162 and the pig 166. The two sealing cups 160 have an inner spacer ring 167 with O-ring type seals 168 and 169 which allows the two sealing cups 160 to be identical and perform the additional benefit of redundant sealing. It will be noted that there is a gap inside each of the sealing cups 160 as the internal bore 170 of the sealing cups 160 is larger than the outer diameter 172 of pig body 166. Pig guide bushings 180 and 182 are of a low friction material mount to pig body 166 and assist the thruster pig assembly to slide along the pipeline, but as they must be smaller than the internal diameter of the pipeline, they will slide eccentrically to the centerline of the pipeline. This means that if sealing cups 160 are rigidly mounted to pig body 174, they will be pressed more tightly on one side that the other, accentuating the wear on that side and limiting the service life of the thruster pig assembly 120. However, sealing cups 160 are mounted in such a way as to have clearances to allow the sealing cups 160 to remain concentric to the pipeline bore and give a uniform lower stress to the resilient cup members 164. This means rather than the resilient cup members 164 having to support the weight of all the metal parts of the thruster pig assembly and handle any moments caused from the coiled tubing, they simply glide in a centralized state.

Figures 14, 15:
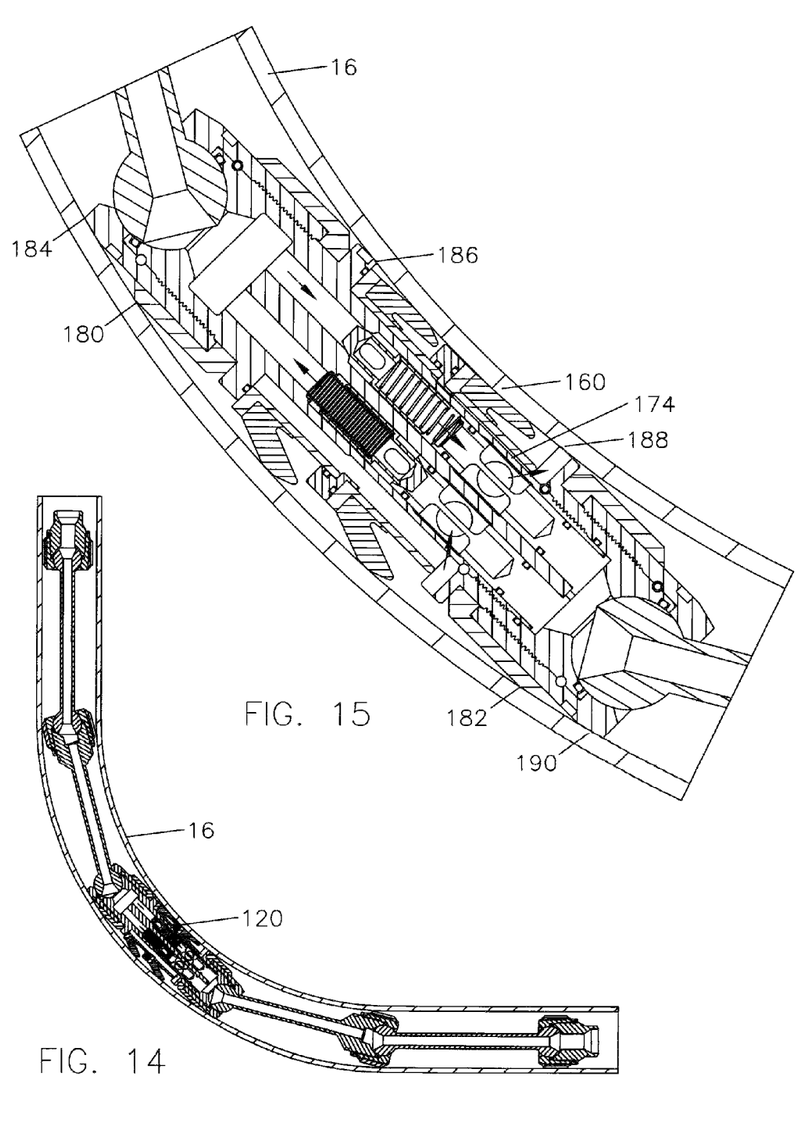
FIG. 14 is the thruster pig assembly of FIG. 12, but being shown passing through a pipeline bend.
FIG. 15 is an enlargement of the central portion of FIG. 14.

Referring now to FIG. 14, thruster pig assembly 120 is shown going through an extreme pipe bend such as was indicated as 16 in FIG. 1.

Referring now to FIG. 15 which is an enlargement of the central section of FIG. 14, pig guide bushings 180 and 182 are shown to be close to contacting the pipeline internal diameter at 180 and 182 and various parts of pig body 174 is close to contacting the pipeline internal diameter at 184, 186, 188, and 190. If the sealing cups 160 were held in a centralized position they would be crushed on the inside of the bend and would not be touching the inside of the pipe internal bore on the outside of the bend. In FIG. 15, sealing cups 160 have been allowed to slide down and to the left in the view to not be crushed on the upper right side and to remain in sealing contact on the lower left side. The ability of sealing cups 160 to float relative to the pig body improve their performance both in straight long distance travel and in short distance travel around bends.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. A protector for protecting the internal bore of a pipeline bend comprising:
    a first liner section which will travel along said pipeline to said pipeline bend but which will not pass through said pipeline bend,
    a one or more of second liner sections which will pass through the bend but are connected to said first liner section,
    releasably connecting said liner sections to a service pig,
    pulling said liner sections into said pipeline with said service pig until said first liner section encounters said bend and stops, and
    continuing travel with said service pig and releasing said service pig from said liner sections.

2. The protector of claim 1 further comprising constraining a line connected to said service pig to be positioned within said liner sections rather than contacting said pipeline bend.

3. The protector of claim 2 further comprising said line is a coiled tubing string.

4. The protector of claim 3 further comprising one or more of said liner sections has a low friction material to engage said coiled tubing string.

5. The protector of claim 2 further comprising said line is a wire.

6. The protector of claim 5 further comprising one or more of said liner sections have one or more rollers to engage said wire.

7. The protector of claim 1, further comprising said pipeline bend having a center plane defined by the center of said pipeline along said bend and said one or more of said second sections are profiled such that said one or more second sections contact said pipeline bend along two spaced apart locations on each said of said center plane such that the angle of contact relative to said center plane causes the normal loading of said contact to be increased and therefore for the frictional force holding said protector in said pipeline bend to be increased.

8. The protector of claim 1 further comprising that when said service pig returns to said pipeline bend, said service pig:
    engages said liner sections, and
    moves said liner sections along said pipeline.

9. The protector of claim 1 further comprising said liner sections are installed into said pipeline through a work window.

10. The protector of claim 1 further comprising said service pig is suited for removing blockages from said pipeline.

11. A protector for protecting the internal bore of a pipeline bend from a line being pulled through said pipeline bend during servicing operations comprising:
    a first liner section which will travel along said pipeline to said pipeline bend but which will not pass through said pipeline bend,
    a one or more of second liner sections which will pass through the bend but are connected to said first liner section,
    releasably connecting said liner sections to a service pig,
    pulling said liner sections into said pipeline with said service pig until said first liner section encounters said bend and stops,
    continuing travel with said service pig and releasing said service pig from said liner sections, and
    constraining a line connected to said service pig to be positioned within said liner sections rather than contacting said pipeline bend.

12. The protector of claim 11 further comprising said line is a coiled tubing string.

13. The protector of claim 12 further comprising one or more of said liner sections has a low friction material to engage said coiled tubing string.

14. The protector of claim 11 further comprising said line is a wire.

15. The protector of claim 14, further comprising one or more of said liner sections have one or more rollers to engage said wire.

16. The protector of claim 1, further comprising said pipeline bend having a center plane defined by the center of said pipeline along said bend and said one or more of said second sections are profiled such that said one or more second sections contact said pipeline bend along two spaced apart locations on each said of said center plane such that the angle of contact relative to said center plane causes the normal loading of said contact to be increased and therefore for the frictional force holding said protector in said pipeline bend to be increased.

17. The protector of claim 11 further comprising that when said service pig returns to said pipeline bend, said service pig:
    engages said liner sections, and
    moves said liner sections along said pipeline.

18. The protector of claim 11 further comprising said liner sections are installed into said pipeline through a work window.

19. The protector of claim 11 further comprising said service pig is suited for removing blockages from said pipeline.

* * * * *